United States Patent
Hirata et al.

(10) Patent No.: US 11,894,745 B2
(45) Date of Patent: Feb. 6, 2024

(54) VIBRATING MOTOR AND HAPTIC DEVICE INCLUDING MOVABLE PORTION WITH HOLDING PORTION

(71) Applicant: Nidec Corporation, Kyoto (JP)

(72) Inventors: Atsunori Hirata, Kyoto (JP); Hiroaki Hirano, Kyoto (JP); Ryoichi Mitsuhata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 118 days.

(21) Appl. No.: 17/547,300

(22) Filed: Dec. 10, 2021

(65) Prior Publication Data
US 2022/0209637 A1 Jun. 30, 2022

(30) Foreign Application Priority Data
Dec. 25, 2020 (JP) ................. 2020-217897

(51) Int. Cl.
*H02K 33/02* (2006.01)

(52) U.S. Cl.
CPC ................... *H02K 33/02* (2013.01)

(58) Field of Classification Search
CPC .. H02K 7/1869; H02K 7/1876; H02K 7/1892; H02K 33/00; H02K 33/02; H02K 33/06; H02K 33/08; H02K 33/10; H02K 33/12; H02K 33/14; H02K 33/16; H02K 33/18; H02K 35/02
USPC ........ 310/25, 15, 12.01, 81, 80, 321, 20, 21, 310/28–30, 36–37
See application file for complete search history.

(56) References Cited

U.S. PATENT DOCUMENTS

| | | | | |
|---|---|---|---|---|
| 6,323,568 B1* | 11/2001 | Zabar | ..................... | H02K 33/04 310/12.24 |
| 6,326,706 B1* | 12/2001 | Zhang | .................. | F04B 35/045 310/12.32 |
| 7,078,832 B2* | 7/2006 | Inagaki | .................... | H02K 7/14 335/238 |
| 7,316,545 B2* | 1/2008 | Lenke | .................. | F04B 17/046 92/169.1 |
| 7,981,107 B2* | 7/2011 | Olsen | ................ | A61M 5/14276 604/152 |
| 9,004,883 B2* | 4/2015 | Neelakantan | ......... | F04B 17/046 417/415 |
| 9,906,109 B2* | 2/2018 | Endo | ...................... | H02K 33/16 |
| 10,424,429 B2* | 9/2019 | Fatemi | ................. | H01F 7/1607 |
| 10,890,169 B2* | 1/2021 | Jeong | .................. | F04B 39/0061 |
| 2002/0195884 A1* | 12/2002 | Ichii | ....................... | A61C 17/34 310/15 |

(Continued)

FOREIGN PATENT DOCUMENTS

| | | |
|---|---|---|
| JP | 08-065990 A | 3/1996 |
| JP | 2006-183754 A | 7/2006 |

*Primary Examiner* — Maged M Almawri
(74) *Attorney, Agent, or Firm* — Keating & Bennett, LLP

(57) ABSTRACT

A vibrating motor includes a stationary portion, and a movable portion capable of vibrating with respect to the stationary portion along a center axis extending in a vertical direction. The stationary portion includes a bearing portion which extends along the center axis and supports the movable portion to be able to vibrate along the center axis, and a coil including a conductive wire wound around the center axis. The bearing portion includes a first region including a coil inner region on a radially inner side of the coil.

16 Claims, 7 Drawing Sheets

(56) References Cited

U.S. PATENT DOCUMENTS

| | | | |
|---|---|---|---|
| 2004/0128781 A1* | 7/2004 | Kunita | H02K 33/08 15/22.2 |
| 2004/0241017 A1* | 12/2004 | Buzzi | F04B 19/006 417/415 |
| 2005/0089418 A1* | 4/2005 | Bonfardeci | F04B 17/046 417/417 |
| 2009/0232666 A1* | 9/2009 | Choi | H02K 33/16 417/212 |
| 2011/0133577 A1* | 6/2011 | Lee | H02K 33/18 310/15 |
| 2013/0169071 A1* | 7/2013 | Endo | H02K 33/12 310/25 |
| 2017/0214306 A1* | 7/2017 | Katada | H02K 33/16 |
| 2018/0219465 A1* | 8/2018 | Katada | B06B 1/045 |
| 2018/0250107 A1* | 9/2018 | Dai | H02K 1/2791 |

* cited by examiner

VIBRATING MOTOR AND HAPTIC DEVICE INCLUDING MOVABLE PORTION WITH HOLDING PORTION

CROSS-REFERENCE TO RELATED APPLICATIONS

The present application claims priority under 35 U.S.C. § 119 to Japanese Patent Application No. 2020-217897, filed on Dec. 25, 2020, the entire contents of which are hereby incorporated herein by reference.

1. Field of the Invention

The present disclosure relates to a vibrating motor and a haptic device.

2. Background

Conventionally, various devices such as portable devices like smartphones have been provided with a vibrating motor as a vibration generator. The vibrating motor is used for a function of notifying the user of an incoming call, an alarm, or the like, or a function of haptic feedback in a human interface, for example.

A conventional vibrating motor includes a case, a coil, an elastic portion, and a movable portion. The movable portion includes a magnet. The movable portion and the case are often connected by an elastic portion. When the coil is energized to generate a magnetic field, the movable portion vibrates.

Here, in a case where a direction orthogonal to a vibration direction of the movable portion is defined as a radial direction, and the movable portion and the coil are arranged to directly face each other in the radial direction with a gap interposed therebetween in the radial direction, it is necessary to increase the gap to some extent, and downsizing of the vibrating motor in the radial direction is hindered.

SUMMARY

An example embodiment of a vibrating motor of the present disclosure includes a stationary portion, and a movable portion capable of vibrating with respect to the stationary portion along a center axis extending in a vertical direction. The stationary portion includes a bearing portion which extends along the center axis and supports the movable portion to be able to vibrate along the center axis, and a coil including a conductive wire wound around the center axis. The bearing portion includes a first region including a coil inner region on a radially inner side of the coil.

The above and other elements, features, steps, characteristics and advantages of the present disclosure will become more apparent from the following detailed description of the example embodiments with reference to the attached drawings.

DETAILED DESCRIPTION

Figure 1:
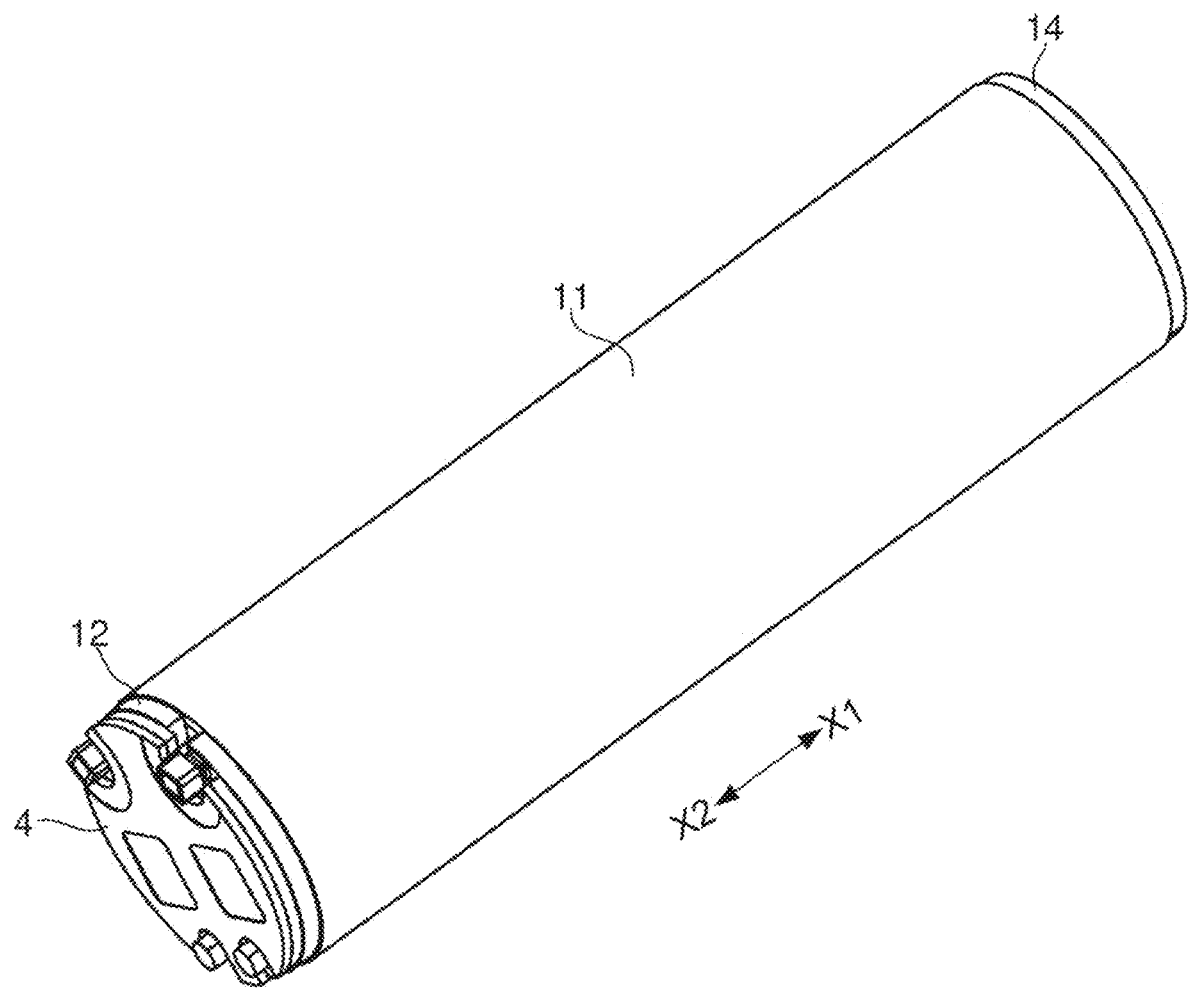
FIG. 1 is a perspective view of a vibrating motor according to an example embodiment of the present disclosure.

Example embodiments of the present disclosure will be described hereinbelow with reference to the drawings.

Incidentally, in the drawings, a direction in which a center axis J of a vibrating motor 10 extends is referred to as a "vertical direction", an upper side is referred to as X1, and a lower side is referred to as X2. Incidentally, the vertical direction does not limit the attaching direction of the vibrating motor 10 when the vibrating motor 10 is mounted on a device.

A radial direction with respect to the center axis J is simply referred to as a "radial direction", a direction approaching the center axis J is referred to as a radially inward direction, and a direction away from the center axis J is referred to as a radially outward direction.

Figure 2:
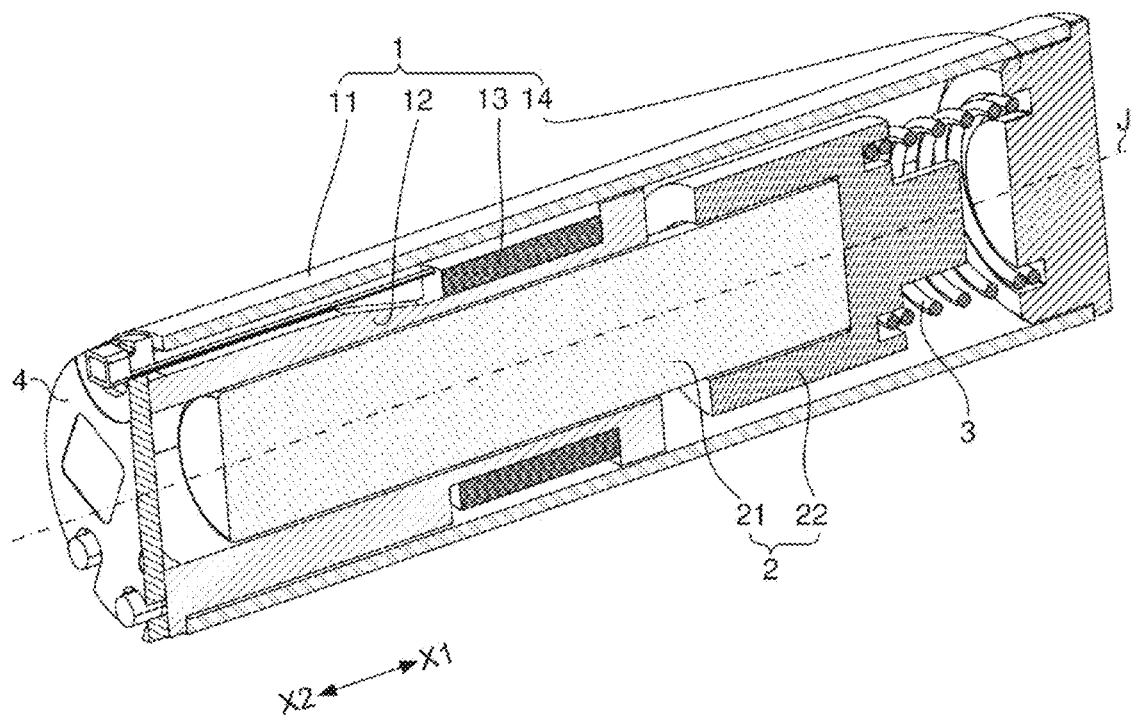
FIG. 2 is a longitudinal sectional perspective view of a vibrating motor according to an example embodiment of the present disclosure.
Figure 3:
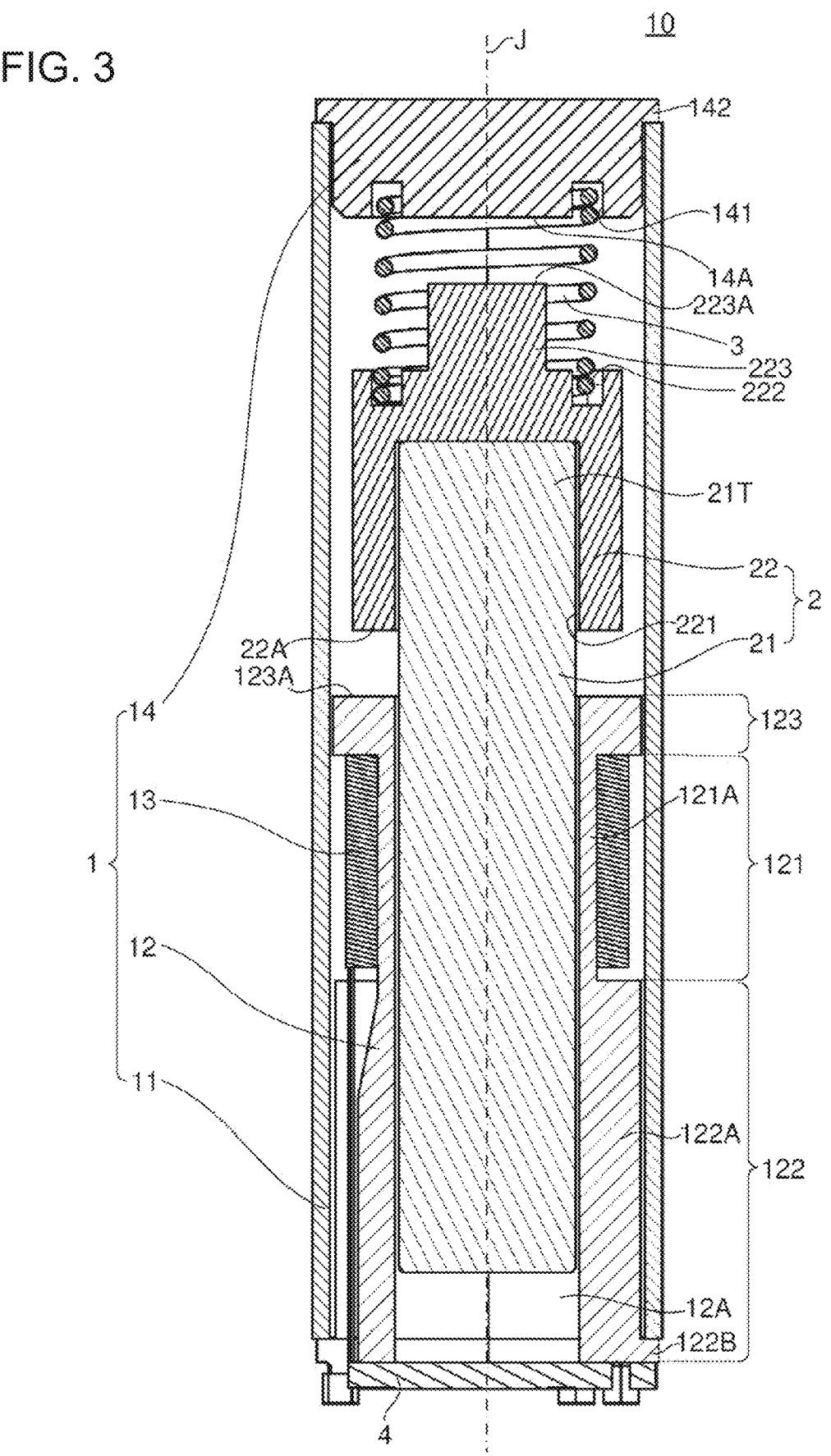
FIG. 3 is a longitudinal sectional view of a vibrating motor according to an example embodiment of the present disclosure.

FIG. 1 is a perspective view of the vibrating motor 10 according to an example embodiment of the present disclosure; FIG. 2 is a longitudinal sectional perspective view of the vibrating motor 10 illustrated in FIG. 1. FIG. 3 is a longitudinal sectional view of the vibrating motor 10 illustrated in FIG. 1.

The vibrating motor 10 includes a stationary portion 1 and a movable portion 2. In this example embodiment, the vibrating motor 10 further includes an elastic portion 3 and a board 4. The movable portion 2 extends along the center axis J. The movable portion 2 can vibrate with respect to the stationary portion 1 along the center axis J. The center axis J extends in the vertical direction.

The stationary portion 1 includes a bearing portion 12 and a coil 13. In this example embodiment, the stationary portion 1 further includes a housing 11 and a top surface portion 14.

The housing 11 is a cylindrical member extending in the vertical direction. Incidentally, the housing 11 is not limited to the cylindrical shape, and may have, for example, a quadrangular tubular shape or the like. That is, it is sufficient if the housing 11 has a tubular shape extending in the vertical direction. The housing 11 is made of a magnetic material. The magnetic material is stainless steel, for example.

The bearing portion 12 is a tubular sleeve bearing extending along the center axis J. The bearing portion 12 is made of, for example, a resin having a low friction coefficient and a low wear property. The resin is, for example, polyacetal (POM).

The bearing portion 12 has a cylindrical hollow portion 12A extending in the vertical direction. The bearing portion 12 includes a first region 121, a second region 122, and a third region 123. The second region 122 is arranged below the first region 121. That is, the bearing portion 12 has the second region 122 arranged below the first region 121. The third region 123 is arranged above the first region 121. The inner diameters of the first region 121, the second region 122, and the third region 123 are substantially the same. As a result, a hollow portion 12A having a substantially constant diameter in the vertical direction is formed.

The first region 121, the second region 122, and the third region 123 are integrally formed. The first region 121 has a cylindrical shape extending in the vertical direction. A conductive wire is wound around the radially outer periphery of the first region 121 to form the coil 13. The coil 13 is formed by winding a conductive wire around the center axis J. The radially inner surface of the coil 13 is in contact with the radially outer surface of the first region 121. That is, the bearing portion 12 has the first region 121, and the first region 121 has a coil inner region 121A arranged on the radially inner side of the coil 13.

The radially outer end position of the first region 121 coincides with the radially inner end position of the coil 13. As a result, at the time of manufacturing the vibrating motor 10, the coil 13 can be wound around the first region 121 after the bearing portion 12 is formed, and thus mass productivity of the vibrating motor 10 is improved.

The second region 122 has a cylindrical base portion 122A extending in the vertical direction and a third protruding portion 122B protruding radially outward from the lower end portion of the base portion 122A. That is, the second region 122 has the third protruding portion 122B protruding radially outward. The third protruding portion 122B has an annular shape. At the time of manufacturing the vibrating motor 10, the bearing portion 12 is inserted into the housing 11 from below. By the insertion, the upper surface of the third protruding portion 122B comes into contact with the lower surface of the housing 11 in the vertical direction. As a result, the bearing portion 12 can be positioned with respect to the housing 11 in the vertical direction.

In a state where the bearing portion 12 is housed in the housing 11, the housing 11 is arranged on the radially outer side relative to the radially outer end of the coil 13. That is, the stationary portion 1 includes the tubular housing 11 which is arranged on the radially outer side relative to the radially outer end of the coil 13 and extends in the vertical direction.

The radially outer surface of the base portion 122A is arranged on the radially outer side relative to the radially outer surface of the coil 13. That is, the radially outer surface of the second region 122 is arranged on the radially outer side relative to the radially outer surface of the first region 121. The upper surface of the second region 122 is arranged to face the lower end of the coil 13 in the vertical direction. As a result, the coil 13 can be suppressed from moving downward from the upper surface of the second region 122.

The third region 123 has a cylindrical shape extending in the vertical direction. The radially outer end of the third region 123 is arranged on the radially outer side relative to the radially inner end of the coil 13. The lower surface of the third region 123 is arranged to face the upper end of the coil 13 in the vertical direction. The third region 123 is a flange portion. As a result, the coil 13 can be suppressed from moving upward from the lower surface of the third region 123.

The movable portion 2 includes a core portion 21 and a holding portion 22.

The core portion 21 is a columnar member extending along the axial direction. In this example embodiment, the core portion includes, for example, two magnets arranged in the vertical direction, and a magnetic body vertically sandwiched by the magnets. In this case, for example, the lower side of the upper magnet is the N pole, and the upper side is the S pole. The upper side of the lower magnet is the N pole, and the lower side is the S pole. That is, the N poles face each other in the vertical direction with the magnetic body interposed therebetween. When the housing is made of a magnetic material, it is possible to suppress leakage of the magnetic field generated by the magnet and the coil 13 to the outside of the vibrating motor 10 and to increase a magnetic force. Incidentally, the magnetic pole of each magnet may be opposite to the above in the vertical direction.

The holding portion 22 holds an upper end portion 21T of the core portion 21. The holding portion 22 has a columnar recess 221 recessed upward in a columnar shape. The upper end portion 21T is arranged in the columnar recess 221. The upper end portion 21T is fixed to the columnar recess 221 by, for example, adhesion. That is, the holding portion 22 is fixed to the core portion 21.

The holding portion 22 functions as a weight and is made of metal, for example. An example of the metal is a tungsten alloy.

The holding portion 22 has an annular recess 222 recessed downward in an annular shape from the upper surface. The vibrating motor 10 includes the elastic portion 3. The lower end portion of the elastic portion 3 is fixed to the annular recess 222. The elastic portion 3 is fixed to the annular recess 222 by welding or adhesion, for example. That is, the elastic portion 3 is arranged above the holding portion 22. The lower end portion of the elastic portion 3 is fixed to the holding portion 22.

The stationary portion 1 has a top surface portion 14. The top surface portion 14 is a substantially disk-shaped lid member centered on the center axis J. The top surface portion 14 has an annular recess 141 which is annularly recessed upward from the lower surface. The upper end portion of the elastic portion 3 is fixed to the annular recess 141. The elastic portion 3 is fixed to the annular recess 141 by welding or adhesion, for example. That is, the upper end portion of the elastic portion 3 is connected to the top surface portion 14.

The top surface portion 14 has a top surface flange portion 142 protruding in the radial direction. At the time of manufacturing the vibrating motor 10, the top surface portion 14 is inserted into the housing 11 from above. At this time, the lower surface of the top surface flange portion 142 is in contact with the upper surface of the housing 11 in the vertical direction. As a result, the top surface portion 14 can be positioned in the vertical direction with respect to the housing 11, and the strength of the vibrating motor 10 can be improved.

With such a configuration, the movable portion 2 is supported by the top surface portion 14 with the elastic portion 3 interposed therebetween. In a state where the elastic portion 3 has a natural length, as illustrated in FIG. 3, a lower part of the core portion 21 is housed in the hollow portion 12A of the bearing portion 12. As a result, the core portion 21 is supported by the bearing portion 12 so as to be able to vibrate along the center axis J. That is, the bearing portion 12 supports the movable portion 2 so as to be able to vibrate along the center axis J. That is, the bearing portion 12 extends along the center axis J and supports the movable portion 2 so as to be able to vibrate along the center axis J. Further, the lower side of the movable portion 2 is supported by the bearing portion 12, but the lower side of the movable portion 2 is not supported in the axial direction. As a result, as compared with a case where the movable portion is supported by an elastic portion or the like from both sides of the vertical direction, it is possible to suppress the restoring force of the movable portion in the vertical direction from becoming larger than necessary. Therefore, the vibration of the movable portion in the vertical direction can be increased. Further, since it is not necessary to arrange the elastic portion below the movable portion 2, the configuration of the vibrating motor 10 is simplified, and mass productivity is improved.

When the coil 13 is energized, a magnetic field is generated from the coil 13. The movable portion 2 vibrates in the vertical direction by the interaction between the generated magnetic field and the magnetic field by the core portion 21.

Since the first region 121 includes the coil inner region 121A, the movable portion 2 and the coil 13 can be separated by the coil inner region 121A. As a result, the radial thickness of the coil inner region 121A can be reduced, and the vibrating motor 10 can be downsized in the radial direction.

The second region 122 is arranged below the lower end of the coil 13. Therefore, by providing the bearing portion 12 with the second region 122 in addition to the first region 121, the vertical length of the inner surface of the bearing portion 12 radially facing the movable portion 2 is increased, and the inclination of the movable portion 2 during vibration can be suppressed. As a result, the vibration of the vibrating motor 10 is stabilized.

As illustrated in FIG. 3, a part of the movable portion 2 is arranged on the radially inner side of each of the radially inner surface of the first region 121 and the radially inner surface of the second region 122. More specifically, in a state where the elastic portion 3 has a natural length, a part of the movable portion 2 is arranged on the radially inner side of each of the radially inner surface of the first region 121 and the radially inner surface of the second region 122. As a result, the vertical length of the movable portion 2 radially facing the inner surface of the bearing portion 12 is increased, and the inclination of the movable portion 2 at the time of vibration can be suppressed. Therefore, the vibration can be stabilized. Incidentally, in a state where the elastic portion 3 has a natural length, a part of the movable portion 2 may not be positioned on the radially inner side of the second region 122.

The bearing portion 12 has the third region 123 arranged above the first region 121. As a result, the vertical length of the inner surface of the bearing portion 12 radially facing the movable portion 2 is increased, and the inclination of the movable portion 2 at the time of vibration can be further suppressed. Incidentally, the radially outer end of the third region 123 may be arranged on the radially inner side relative to the radially inner end of the coil 13.

A lower surface 22A of the holding portion 22 is arranged to directly face an upper surface 123A of the third region 123 in the vertical direction. That is, the movable portion 2 has the surface 22A which is arranged to directly face the upper surface 123A of the third region 123 in the vertical direction. As a result, the surface 22A of the movable portion 2 can come into contact with the upper surface 123A of the third region 123, and the downward movement of the movable portion 2 can be restricted. In particular, since the inner diameter of the second region 122 is constant in the vertical direction, the downward movement of the movable portion 2 is restricted as described above, so that the movable portion 2 can be suppressed from coming out below the second region 122. Further, as will be described later, when the board 4 is arranged below the second region 122, a gap between the movable portion 2 and the board 4 in the vertical direction can be appropriately maintained.

As illustrated in FIG. 3, the holding portion 22 has a protruding portion 223 protruding upward. The protruding portion 223, that is, the upper surface 223A of the holding portion 22 is arranged to directly face the lower surface 14A of the top surface portion 14 in the vertical direction. As a result, the upper surface 223A of the holding portion 22 can come into contact with the lower surface 14A of the top surface portion 14, and the upward movement of the movable portion 2 can be restricted.

Figure 4:
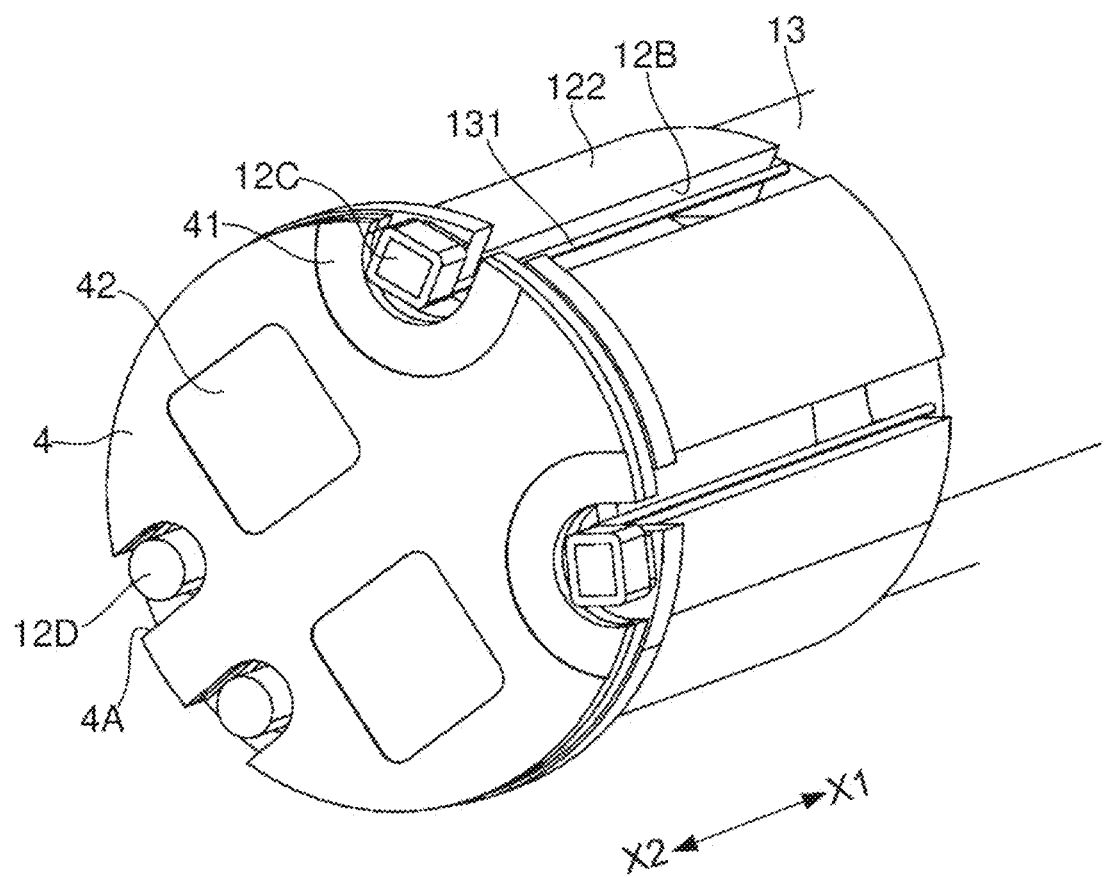
FIG. 4 is a perspective view illustrating a configuration related to an electrical connection between a board and a coil according to an example embodiment of the present disclosure.

FIG. 4 is a perspective view illustrating a configuration related to electrical connection between the board 4 and the coil 13. As illustrated in FIG. 4, a recess 12B extending in the vertical direction and recessed radially inward is formed on the radially outer surface of the second region 122. At least a part of the lead wire 131 drawn out from the coil 13 is housed in the recess 12B. Incidentally, the entire lead wire 131 may be housed in the recess 12B. That is, it is sufficient if at least a part of the lead wire 131 is housed in the recess 12B.

As a result, it is not necessary to route the lead wire 131 radially outward of the bearing portion 12. Therefore, as compared with a case where the lead wire 131 is routed radially outward of the bearing portion 12, in the vibrating motor 10, the lead wire 131 can be suppressed from interfering with other portions or other members, and the vibrating motor 10 can be downsized in the radial direction. Further, the manufacturing efficiency of the vibrating motor 10 is improved.

As illustrated in FIG. 4, the board 4 is arranged below the second region 122 and expands in the radial direction. The board 4 may be a flexible printed circuit board or a rigid printed circuit board.

The bearing portion 12 has a first protruding portion 12C protruding downward from the lower surface of the second region 122. The lower end portion of the lead wire 131 drawn out downward is wound around the first protruding portion 12C. That is, the lead wire 131 is tied to the first protruding portion 12C.

The board 4 includes a first electrode portion 41 and a second electrode portion 42. The first electrode portion 41 and the second electrode portion 42 are electrically connected by a wiring pattern (not illustrated in FIG. 4) inside the board 4. At the time of manufacturing the vibrating motor 10, an operation of attaching the board 4 to the second region 122 and electrically connecting the first electrode portion 41 and the lead wire 131 tied to the first protruding portion 12C by soldering or the like is performed. The operation may be performed automatically or manually. Therefore, the vibrating motor 10 can be manufactured with more excellent workability compared to the case of directly connecting the lead wire to the board. Further, with a mechanism of binding the lead wire 131 with the first protruding portion 12C, the reliability of the electrical connection between the lead wire and the board 4 is improved even in a case where the outer diameter of the lead wire is small. Therefore, even in a case where the outer diameter of the lead wire is small or large, the reliability of the electrical connection between the lead wire and the board is improved. Thus, the outer diameter of the lead wire can be adjusted according to the application of the vibrating motor, and the electric resistance and output characteristics of the coil 13 can be easily adjusted.

In this manner, the lower end portion of the lead wire 131 drawn out downward from the coil 13 is electrically connected to the board 4. As a result, the routing of the lead wire 131 for electrically connecting the coil 13 and the board 4 is facilitated.

The board 4 has a plurality of notch portions 4A recessed from the radially outer edge of the board 4 in a direction of approaching the center axis J. The bearing portion 12 has a plurality of second protruding portions 12D protruding downward from the lower surface of the second region 122. The plurality of second protruding portions 12D are housed in the plurality of notch portions 4A. As a result, the board 4 can be positioned.

Figure 5:
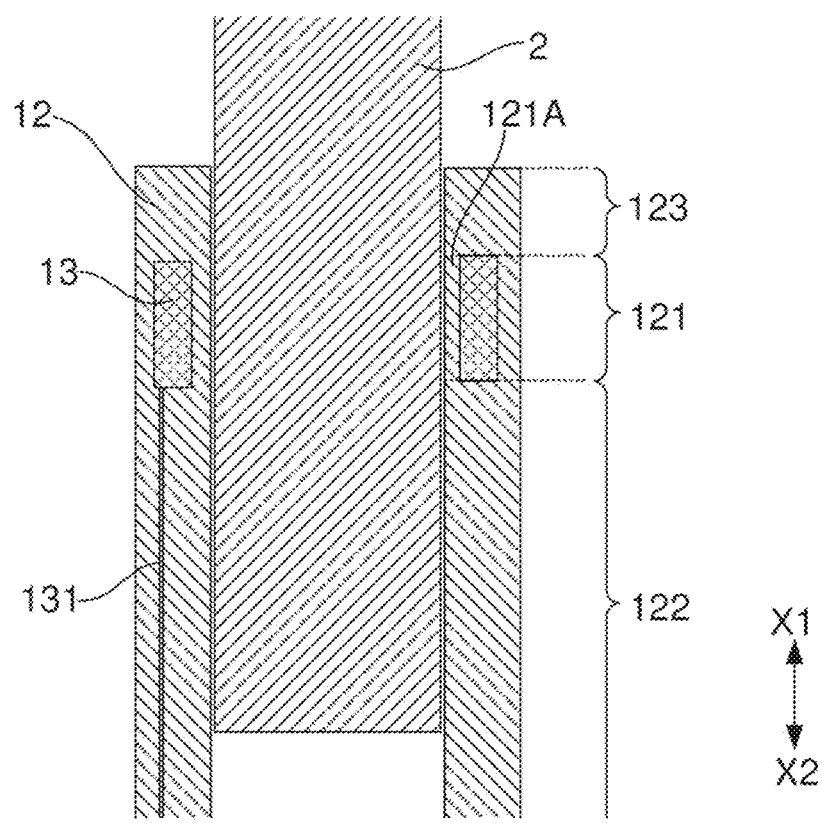
FIG. 5 is a longitudinal sectional view illustrating a partial configuration of a bearing portion according to a modification of an example embodiment of the present disclosure.

FIG. 5 is a view illustrating a partial configuration of the bearing portion 12 according to a modification. In the modification illustrated in FIG. 5, the entire coil 13 is arranged inside the first region 121 and is integrally formed with the first region 121. The coil inner region 121A is a part of the first region 121. Incidentally, a part of the coil 13 may be arranged inside the first region 121. That is, it is sufficient if at least a part of the coil 13 is arranged inside the first region 121 and formed integrally with the first region 121. As a result, the coil 13 can be firmly fixed to the bearing portion 12.

In the configuration illustrated in FIG. 5, the lead wire 131 drawn out from the coil 13 is arranged inside the second region 122 and is integrally formed with the second region 122. As a result, the lead wire 131 can be firmly fixed to the bearing portion 12.

The configuration illustrated in FIG. 5 can be formed by insert molding.

Figure 6:
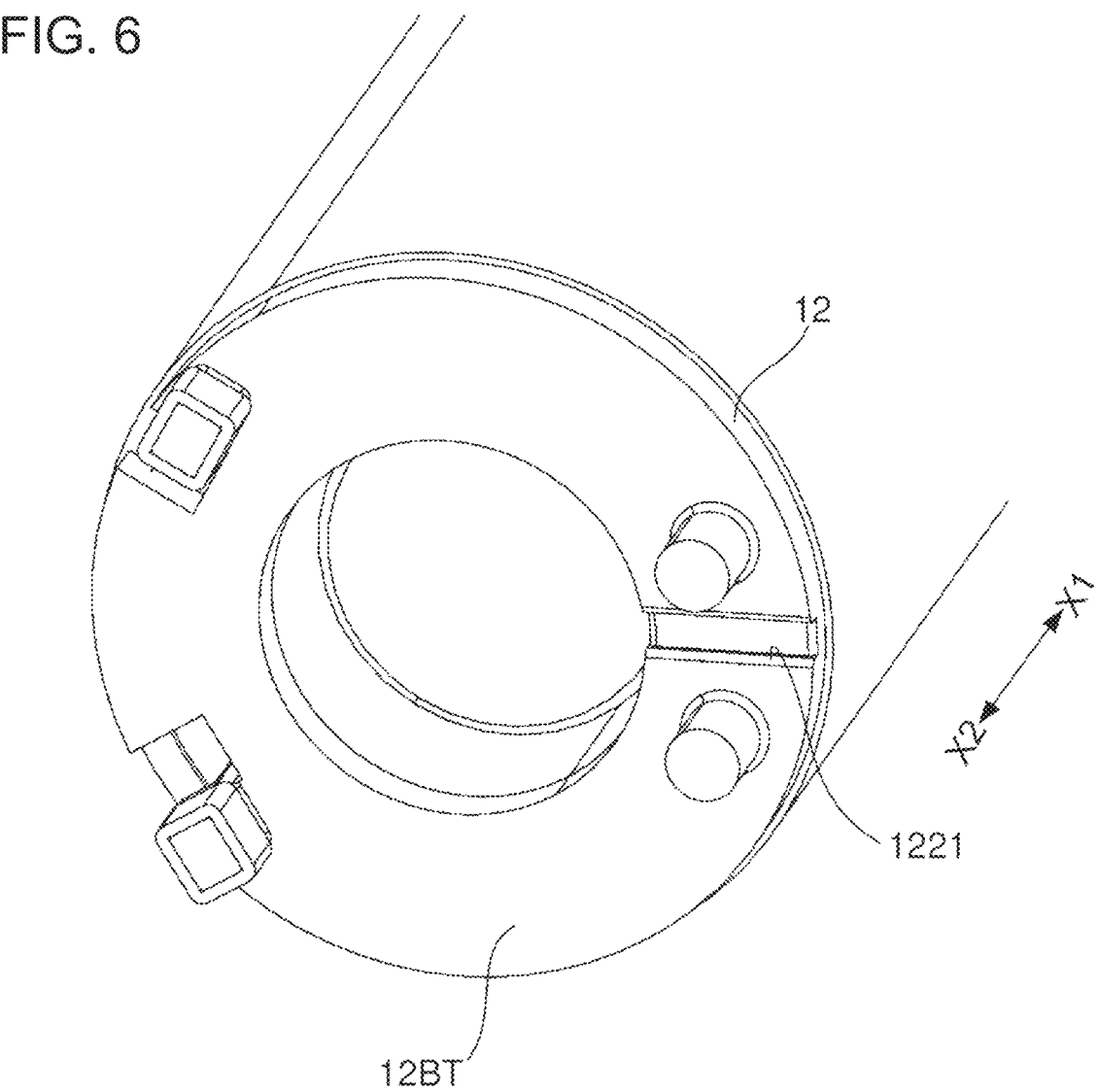
FIG. 6 is a perspective view illustrating a lower end portion of a bearing portion according to another modification of an example embodiment of the present disclosure.

FIG. 6 is a perspective view illustrating a lower end portion 12BT of the bearing portion 12 according to another modification. FIG. 6 is a view of a state in which the board 4 is detached. The lower end portion 12BT of the bearing portion 12 corresponds to the lower end portion of the second region 122.

As illustrated in FIG. 6, a groove-shaped communication portion 1221 extending in the radial direction and recessed upward from the lower surface of the bearing portion 12 is formed in the lower end portion 12BT. The communication portion 1221 allows the radially inner space and the radially outer space of the lower end portion 12BT to communicate with each other. That is, the bearing portion 12 has the communication portion 1221 for communicating the radially inner space and the radially outer space of the bearing portion 12. As a result, in a case where the movable portion 2 vibrates up and down, the gas inside the bearing portion 12 is discharged to the outside of the bearing portion 12 through the communication portion 1221, so that it is possible to suppress a decrease in amplitude of vibration due to compression of the gas inside the bearing portion 12. Further, in the configuration in which the board 4 is arranged below the bearing portion 12 as in this example embodiment, a configuration in which the communication portion 1221 is provided to discharge the gas inside the bearing portion 12 to the outside of the bearing portion 12 is particularly useful.

Incidentally, the communication portion 1221 is not limited to the groove shape, and may be formed as, for example, a through-hole penetrating the bearing portion 12 in the radial direction.

Figure 7:
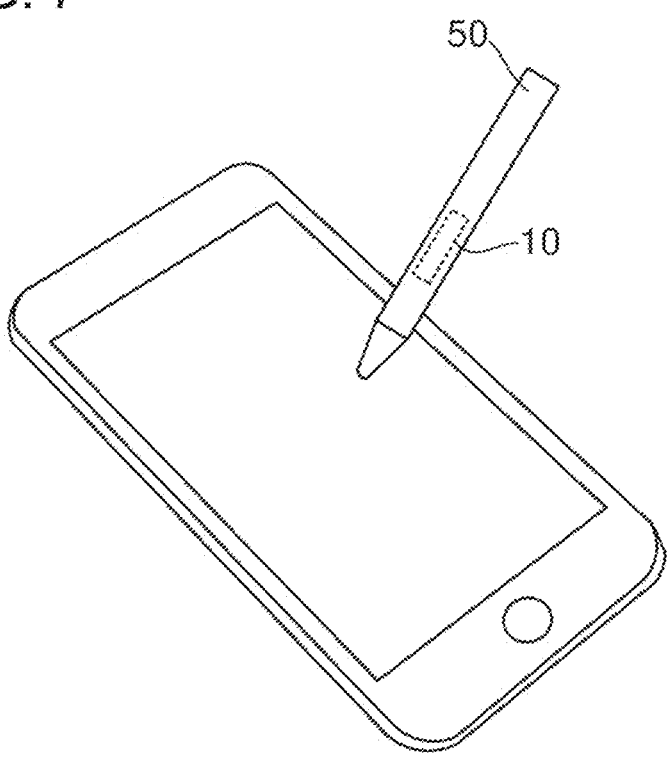
FIG. 7 is a view schematically illustrating a touch pen mounted with a vibrating motor according to an example embodiment of the present disclosure.

FIG. 7 is a view schematically illustrating a touch pen 50 as an example of a target device mounted with the vibrating motor 10. The touch pen 50 is a device which operates a device such as a smartphone or a tablet by being brought into contact with a touch panel of the device. When the touch pen 50 is mounted with the vibrating motor 10, the touch pen 50 can be vibrated to give haptic feedback to a user. That is, the touch pen 50 is an example of a haptic device including the vibrating motor 10. That is, the haptic device includes the vibrating motor 10. For example, the haptic feedback can give the user a feeling as if a character or the like is written on paper or the like with the touch pen 50. By mounting the haptic device with the vibrating motor 10, the haptic device can be downsized.

The target device is not limited to the touch pen, and various devices such as an aerial operation device can be mounted with the vibrating motor 10. For example, a device such as an electronic pen, an electronic writing instrument, or a mouse may be mounted with the vibrating motor 10, and the device may be used as an electronic device capable of inputting a stereoscopic image or a virtual reality image.

The present disclosure can be used for a vibrating motor mounted in various devices such as a touch pen, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vibrating motor comprising:
a stationary portion; and
a movable portion capable of vibrating with respect to the stationary portion along a center axis extending in a vertical direction; wherein
the stationary portion includes:
a bearing portion which extends along the center axis and supports the movable portion to be able to vibrate along the center axis; and
a coil including a conductive wire wound around the center axis;
the bearing portion includes a first region including a coil inner region on a radially inner side of the coil; and
the movable portion includes:
a core portion supported by the bearing portion to be able to vibrate along the center axis; and
a holding portion fixed to the core portion;
the holding portion holds an upper end portion of the core portion;
the holding portion includes a columnar recess which is recessed upward in a columnar shape, the upper end portion of the core portion being located in the columnar recess;
the bearing portion includes a third region above the first region; and
a bottom of the holding portion includes a surface directly facing an upper surface of the third region in the vertical direction.

2. The vibrating motor according to claim 1, wherein a radially outer end position of the first region coincides with a radially inner end position of the coil.

3. The vibrating motor according to claim 1, wherein at least a portion of the coil is inside the first region and is integrally provided together with the first region.

4. The vibrating motor according to claim 1, wherein the bearing portion includes a communication portion which allows a radially inner space of the bearing portion and a radially outer space of the bearing portion to communicate each other.

5. The vibrating motor according to claim 1, wherein
a radially outer end of the third region is on a radially outer side relative to a radially inner end of the coil; and
a lower surface of the third region faces an upper end of the coil in the vertical direction.

6. A haptic device comprising:
the vibrating motor according to claim 1.

7. The vibrating motor according to claim 1, further comprising:
an elastic portion; wherein
the elastic portion is above the holding portion;
a lower end portion of the elastic portion is fixed to the holding portion;
the stationary portion includes a top surface portion to which an upper end portion of the elastic portion is connected; and
an upper surface of the holding portion directly faces a lower surface of the top surface portion in the vertical direction.

8. The vibrating motor according to claim 7, wherein
the stationary portion includes a tubular housing on a radially outer side relative to a radially outer end of the coil and extending in the vertical direction;
the top surface portion includes a top surface flange portion protruding in a radial direction; and
the lower surface of the top surface flange portion is in contact with the upper surface of the housing in the vertical direction.

9. The vibrating motor according to claim 8, wherein
the bearing portion includes a second region below the first region;
the second region includes a third protruding portion protruding radially outward; and
an upper surface of the third protruding portion is in contact with a lower surface of the housing in the vertical direction.

10. The vibrating motor according to claim 1, wherein
the bearing portion includes a second region below the first region; and
the second region is below a lower end of the coil.

11. The vibrating motor according to claim 10, wherein a portion of the movable portion is on a radially inner side of each of a radially inner surface of the first region and a radially inner surface of the second region.

12. The vibrating motor according to claim 10, wherein
a recess extending in the vertical direction and recessed radially inward is on a radially outer surface of the second region; and
at least a portion of a lead wire drawn out from the coil is housed in the recess.

13. The vibrating motor according to claim 10, wherein
a radially outer surface of the second region is on a radially outer side relative to a radially outer surface of the first region; and
an upper surface of the second region opposes a lower end of the coil in the vertical direction.

14. The vibrating motor according to claim 10, further comprising:
a board below the second region and expanding in a radial direction; wherein
a lower end portion of a lead wire drawn out downward from the coil is electrically connected to the board.

15. The vibrating motor according to claim 14, wherein
the bearing portion includes a first protruding portion protruding downward from a lower surface of the second region; and
the lead wire is connected to the first protruding portion.

16. The vibrating motor according to claim 14, wherein
the board includes notch portions recessed from a radially outer edge of the board in a direction of approaching the center axis;
the bearing portion includes second protruding portions protruding downward from a lower surface of the second region; and
the second protruding portions are housed in the notch portions.

* * * * *